US007037191B2

(12) United States Patent
Rodgers et al.

(10) Patent No.: US 7,037,191 B2
(45) Date of Patent: May 2, 2006

(54) GAMING DEVICE HAVING MULTIPLE PAY SLOTS

(75) Inventors: Paulina Rodgers, Reno, NV (US); Karen M. Cregan, Reno, NV (US)

(73) Assignee: IGT, Reno, NV (US)

( * ) Notice: Subject to any disclaimer, the term of this patent is extended or adjusted under 35 U.S.C. 154(b) by 572 days.

(21) Appl. No.: 10/137,530

(22) Filed: May 1, 2002

(65) Prior Publication Data

US 2003/0207710 A1 Nov. 6, 2003

(51) Int. Cl.
*A63F 13/00* (2006.01)

(52) U.S. Cl. .......................................... 463/16; 463/25

(58) Field of Classification Search .................... 463/1, 463/2, 7, 9, 12–13, 15, 16–20, 23, 30, 42, 463/25

See application file for complete search history.

(56) References Cited

U.S. PATENT DOCUMENTS

| | | | |
|---|---|---|---|
| 4,198,052 | A | 4/1980 | Gauselmann |
| 4,448,419 | A | 5/1984 | Telnaes |
| 4,560,161 | A | 12/1985 | Hamano |
| 4,624,459 | A | 11/1986 | Kaufman |
| 4,695,053 | A | 9/1987 | Vazquez, Jr. et al. |
| 4,871,171 | A | 10/1989 | Rivero |
| 5,116,055 | A | 5/1992 | Tracy |
| 5,205,555 | A | 4/1993 | Hamano |
| 5,209,479 | A | 5/1993 | Nagao et al. |
| 5,393,061 | A | 2/1995 | Manship et al. |
| 5,397,125 | A | 3/1995 | Adams |
| 5,407,200 | A | 4/1995 | Zalabah |
| 5,456,465 | A | 10/1995 | Durham |
| 5,611,535 | A | 3/1997 | Tiberio |
| 5,711,525 | A | 1/1998 | Breeding |
| 5,769,716 | A | 6/1998 | Saffari et al. |
| 5,833,536 | A | 11/1998 | Davids et al. |
| 5,890,962 | A | 4/1999 | Takemoto |
| 5,919,088 | A | 7/1999 | Weiss |
| 6,004,207 | A | 12/1999 | Wilson, Jr. et al. |
| 6,059,289 | A | 5/2000 | Vancura |
| 6,062,980 | A | 5/2000 | Luciano |
| 6,071,192 | A | 6/2000 | Weiss |
| 6,089,976 | A | 7/2000 | Schneider et al. |

(Continued)

FOREIGN PATENT DOCUMENTS

| | | |
|---|---|---|
| GB | 2137392 A | 10/1984 |

(Continued)

OTHER PUBLICATIONS

Free Fall Poker written by International Game Technology, published in 2000.

(Continued)

*Primary Examiner*—Scott Jones
(74) *Attorney, Agent, or Firm*—Bell, Boyd & Lloyd LLC

(57) ABSTRACT

The gaming device provides a number of selections. When the player chooses a selection, the gaming device randomly generates a value and randomly places the value into one of a number of adjacent slots. When the bottom of each slot is covered with values, the game removes the values and provides an award to the player. In one embodiment, the award includes a value from each slot and in a preferred embodiment the award includes the smallest value from the slots. The gaming device subtracts the lowest value from the remaining values and the player chooses another selection. The process continues until one of a plurality of possible endings occurs.

24 Claims, 11 Drawing Sheets

U.S. PATENT DOCUMENTS

| | | | |
|---|---|---|---|
| 6,102,798 | A | 8/2000 | Bennett |
| 6,126,547 | A | 10/2000 | Ishimoto |
| 6,135,884 | A | 10/2000 | Hedrick et al. |
| 6,142,824 | A | 11/2000 | Savoca |
| 6,142,875 | A | 11/2000 | Kodachi et al. |
| 6,149,157 | A | 11/2000 | Saun |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,164,652 | A | 12/2000 | Lauretta et al. |
| 6,174,235 | B1 | 1/2001 | Walker et al. |
| 6,190,255 | B1 | 2/2001 | Thomas et al. |
| 6,203,429 | B1 | 3/2001 | Demar et al. |
| 6,220,959 | B1 | 4/2001 | Holmes, Jr. et al. |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,261,177 | B1 | 7/2001 | Bennett |
| 6,270,412 | B1 | 8/2001 | Crawford et al. |
| 6,290,600 | B1 | 9/2001 | Glasson |
| 6,309,300 | B1 | 10/2001 | Glavich |
| 6,312,334 | B1 | 11/2001 | Yoseloff |
| 6,328,649 | B1 | 12/2001 | Randall et al. |
| 6,346,043 | B1 | 2/2002 | Colin et al. |
| 6,347,996 | B1 | 2/2002 | Gilmore et al. |
| 6,364,766 | B1 | 4/2002 | Anderson et al. |
| 6,375,187 | B1 | 4/2002 | Baerlocher |
| 6,398,644 | B1 | 6/2002 | Perrie et al. |
| 6,428,089 | B1 | 8/2002 | Noda |
| 6,428,412 | B1 | 8/2002 | Anderson et al. |
| 6,443,837 | B1 | 9/2002 | Jaffe et al. |
| 6,454,651 | B1 | 9/2002 | Yoseloft |
| RE37,885 | E | 10/2002 | Acres et al. |
| 6,464,581 | B1 | 10/2002 | Yoseloff et al. |
| 6,464,582 | B1 | 10/2002 | Buelocher et al. |
| 6,464,584 | B1 | 10/2002 | Oliver |
| 6,471,208 | B1 | 10/2002 | Yoseloft et al. |
| 6,471,387 | B1 | 10/2002 | Henshaw et al. |
| 6,471,591 | B1 | 10/2002 | Crumby |
| 6,474,758 | B1 | 11/2002 | Hedrick et al. |
| 6,476,798 | B1 | 11/2002 | Bertram et al. |
| 6,477,251 | B1 | 11/2002 | Szreh et al. |
| 6,481,713 | B1 | 11/2002 | Perrie et al. |
| 6,482,089 | B1 | 11/2002 | Demar et al. |
| 6,485,366 | B1 | 11/2002 | Rowe |
| 6,485,367 | B1 | 11/2002 | Joshi |
| 6,506,114 | B1 | 1/2003 | Estes et al. |
| 6,688,975 | B1 * | 2/2004 | Baerlocher et al. ........... 463/16 |

FOREIGN PATENT DOCUMENTS

| | | | |
|---|---|---|---|
| GB | 2161008 | A | 1/1986 |
| GB | 2180682 | A | 4/1987 |
| GB | 2181589 | A | 4/1987 |
| GB | 2225889 | A | 6/1990 |
| GB | 2226436 | A | 6/1990 |

OTHER PUBLICATIONS

Frog Prince written by International Game Technology, published in 2001.

Gold Fever written by Atronic Casino Technology, published in 1999.

Jackpot Party written by WMS, published in 1998.

Plinco Showcase Show Down 746 written by International Game Technology, published in 2001.

Tetris Game Description written by Radica, published in 2000.

Top Dollar Advertisement written by International Game Technology, published in 1998.

Vision Series Double Diamond Mine written by International Game Technology, published Mar. 2001.

* cited by examiner

GAMING DEVICE HAVING MULTIPLE PAY SLOTS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to gaming devices. More particularly, the present invention relates to a gaming device having a multiple pay slot game.

Gaming device manufacturers provide known gaming machines such as slot machines employing a plurality of reels, wherein the reels each have a plurality of symbols. In these games, the player activates or spins the reels, which produce a random generation of a combination of symbols. If the generated combination, or a portion of the combination, matches one of a number of predetermined award producing or winning combinations, the player receives an award. The award is commonly one or more credits that the player can use to play or redeem for money.

Gaming device manufactures also provide known video poker games that generate credits for the player. The player can either use the awarded credits to play more poker hands or redeem the credits for money. These examples as well as many other types of gaming machines award credits to the player.

In general, primary games and secondary games that are visually dynamic tend to capture the player's attention and increase the enjoyment and excitement associated with the game. Moreover, games having increased levels of player interaction also tend to be popular. For example, primary or secondary games wherein the player makes multiple selections and has multiple opportunities to win or accept an award tend to be fun and exciting. An example of such a game is the TOP DOLLAR® gaming machine, which is produced by the assignee of the present invention.

To increase player enjoyment and excitement, and to increase the popularity of the gaming machines, gaming device manufacturers constantly strive to make their gaming devices as fun, exciting and attractive as possible. Manufacturers also attempt to provide games that are relatively simple and intuitive. A continuing need therefore exists to provide new and different primary or secondary games for gaming devices that are visually dynamic, intuitive and provide a high level of player interaction.

SUMMARY OF THE INVENTION

The present invention provides a gaming device having a primary or base or a bonus or secondary game. In one embodiment, the game includes a number of selections and a bin having a plurality of slots. When the player chooses a selection, the game randomly generates a value and randomly places the value into one of the plurality of adjacent slots that make up the bin. When the bottom of each slot includes or is covered with a value, the game removes values from the bin and provides an award to the player. The gaming device can remove values (or a portion of the values)

from the bottom of each slot. Alternatively, the gaming device removes a second layer of values or a third layer of values, etc.

The gaming device of the present invention issues credits (worth a monetary value) and provides random outcomes rather than outcomes based on skill. In one embodiment, the award includes a value from each slot and in a preferred embodiment the award includes the smallest value from the slots. Here, the gaming device subtracts the smallest value from the remaining values in each slot and enables the player to choose another selection.

In one embodiment, this process continues until the player chooses each of the selections. In another embodiment, the process continues until the player chooses each of the selections or chooses a collect or game ending symbol. Still further, the process continues until one of the slots becomes full.

In a further embodiment, the game can generate a multi-slot value. That is, the value covers more than one slot. If the multi-slot value becomes positioned so that an open spot remains between the bottom of one of the slots and the value, the process ends because it is no longer possible to cover the bottom of each slot. Thus, the multi-slot values can potentially end the game.

In one embodiment, the values represent game credits. In an alternative embodiment, the values represent game credits or game credit modifiers such as multipliers. The values can be zero values or negative values. The slots of the bin can be weighted equally or non-equally so that one bin is more likely to receive the values than another. As the player continues to choose the selections, the game provides credit and/or multiplier awards as appropriate. The game accumulates all the awards in an award or credit meter.

It is therefore an advantage of the present invention to provide a gaming device having a dynamic visual display.

Another advantage of the present invention is to provide a gaming device bonus game that is interactive.

Yet another advantage of the present invention is to provide a gaming device having multiple pay slots, wherein the slots can pay off multiple times.

Additional features and advantages of the present invention are described in, and will be apparent from, the following Detailed Description of the Invention and the figures.

DETAILED DESCRIPTION OF THE INVENTION

Gaming Device and Electronics

Figure 1A:
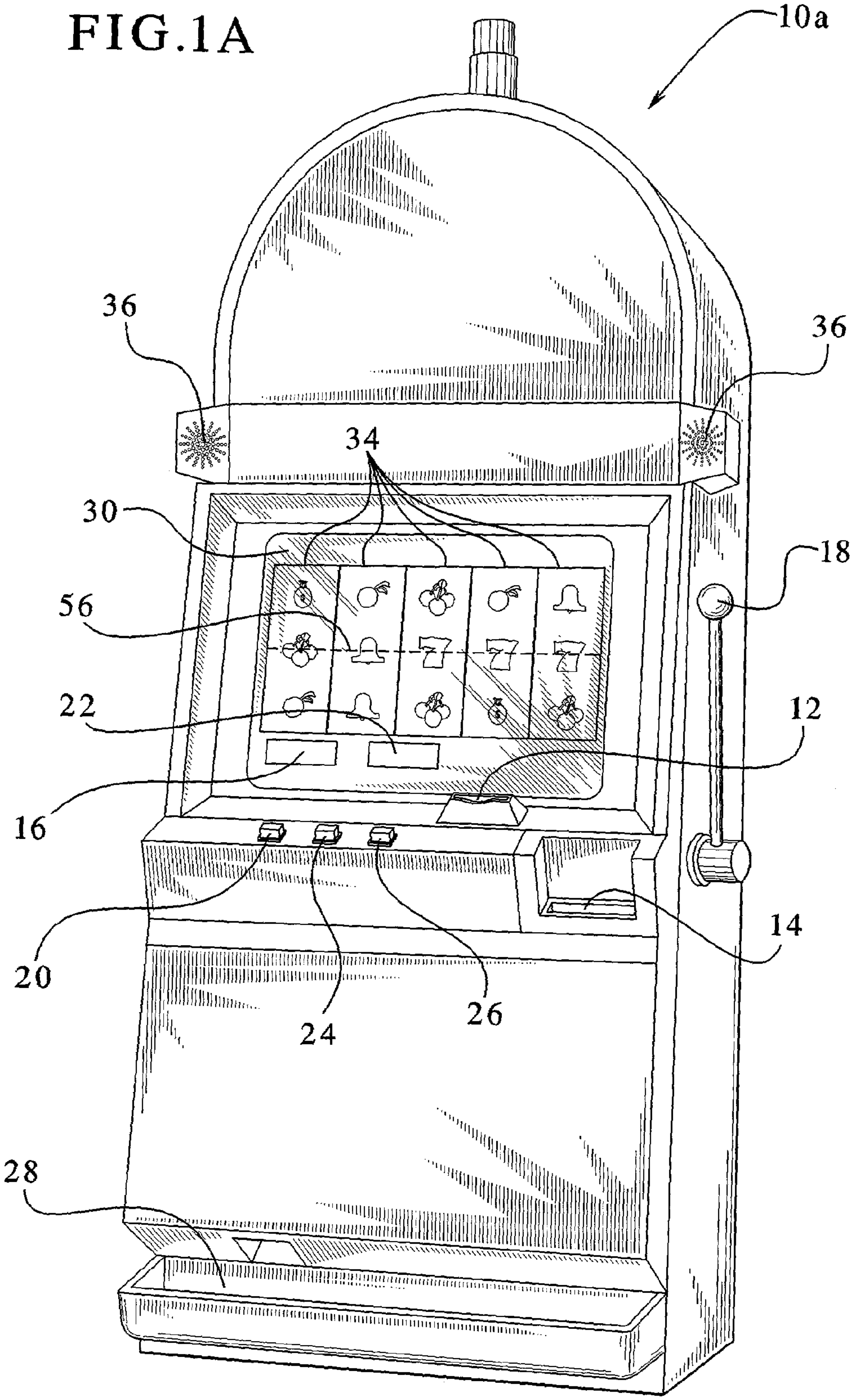
FIGS. 1A and 1B are perspective views illustrating alternative embodiments of the gaming device of the present invention.
Figure 1B:
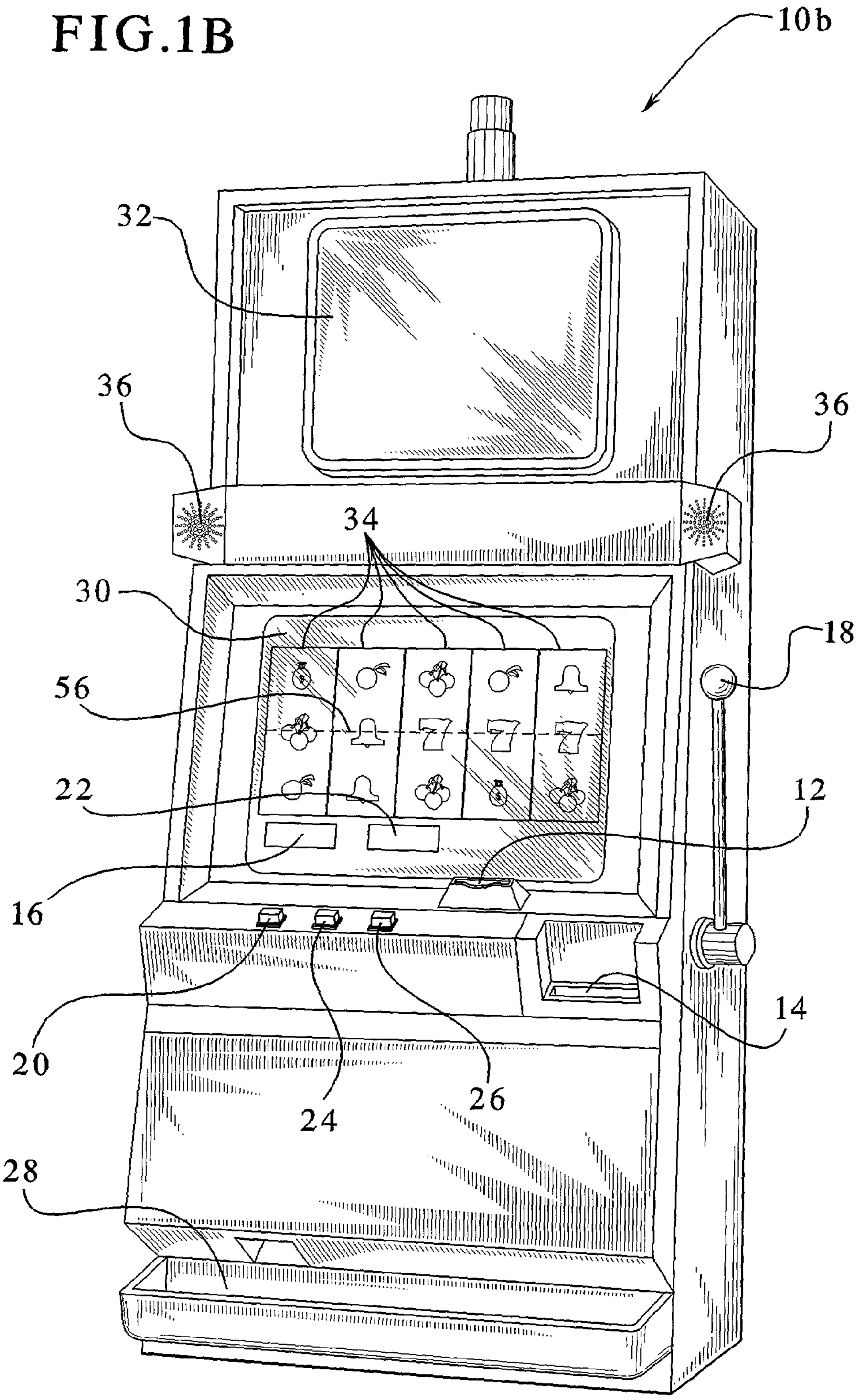

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sifting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
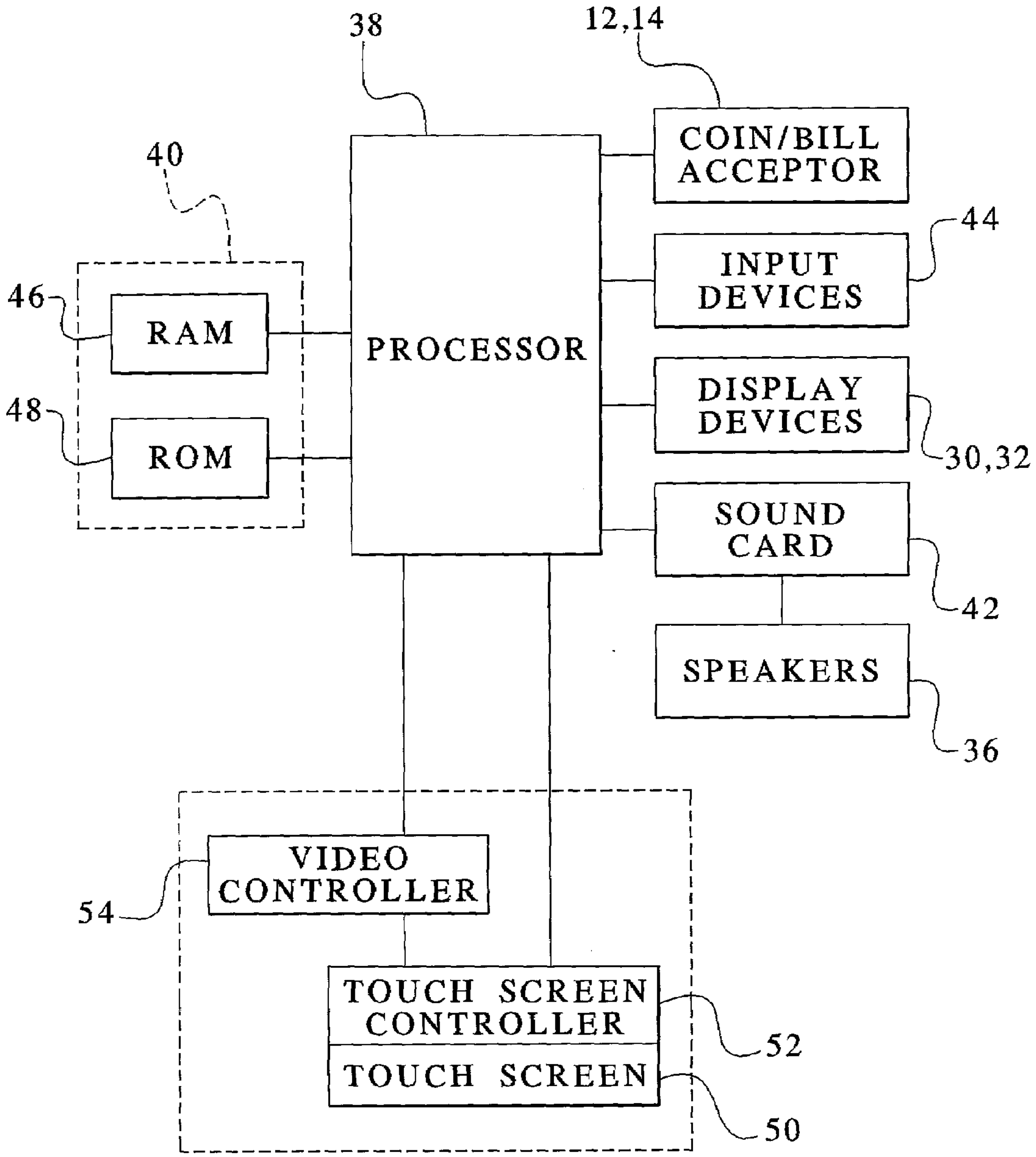
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Figure 3:
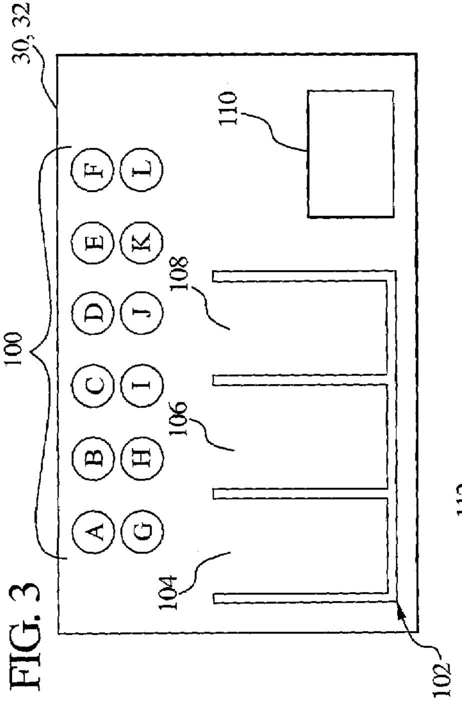
FIG. 3 is an elevation view of a display device illustrating the general components of the primary or secondary game of the present invention.

Referring now to FIG. 3, one of the display devices 30 or 32 shown above in FIGS. 1A and 1B is illustrated. The display device 30 or 32 includes a plurality of selections 100. The display device 30 or 32 may be adapted to display any suitable number of these selections 100. For example, the display device 30 or 32 can display a single selection 100, wherein the player sequentially picks the same selection.

In the illustrated embodiments, the display device 30 or 32 displays twelve selections A through L. In a preferred embodiment, the selections 100 are each areas of a touch screen 50 connected to the processor 38 through the touch screen controller 52 as illustrated in FIG. 2. In this preferred embodiment, the selections 100 appear on the display device 30 or 32 as illustrated here. In an alternative embodiment, the selections 100 reside on the cabinet of the gaming device 10 as electromechanical push buttons, each of which are adapted send a discrete input to the processor 38. The touch screen functions or the buttons thus act as selections or selectors.

The player selects one of the selections 100 to produce a value as illustrated below. The player's choice of one of these selections 100 is random and requires no level of skill. Although the selections 100 provide player interaction and are preferred, it should be appreciated that the gaming device 10 in an alternative embodiment can automatically randomly choose one or more values without player input.

In the illustrated embodiment, the display device 30 or 32 includes a bin 102 having three areas, positions or slots 104, 106 and 108. The bin 102 may be adapted to include any suitable number of areas, positions or slots and is not limited to the three shown here. The areas, positions or slots (hereinafter slots) 104, 106 and 108 may be vertically disposed, as shown, horizontally disposed, diagonally disposed and/or disposed differently at different points in the secondary or primary game of the present invention. When a player chooses one of the selections 100, gaming device 10 randomly generates a value (or selects a previously generated value) and randomly places the value into one of the slots 104,106 and 108.

As the player plays the gaming device of the present invention, gaming device 10 at particular times provides an award to the player, which is accumulated in an award display 110. The award display 110 in one preferred embodiment resides on the display device 30 or 32. In an alternative embodiment, the award display 110 appears elsewhere on the gaming device cabinet as an electromechanical display or a separate digital display.

Figure 4A:
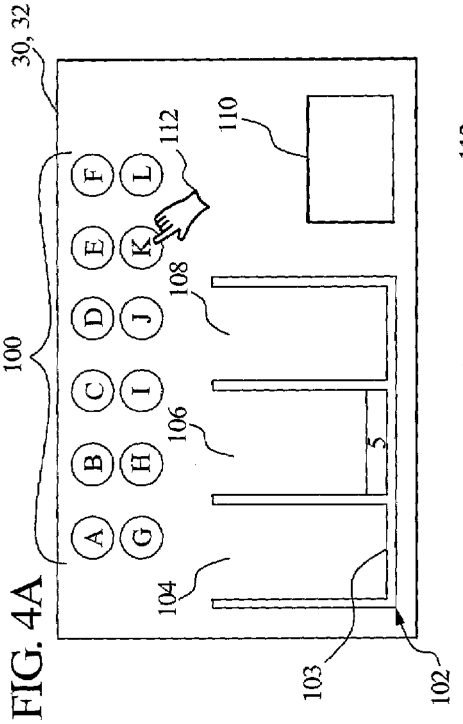
FIGS. 4A though 4S are elevation views of a display device illustrating one embodiment of the primary or secondary game of the present invention.
Figure 4B:
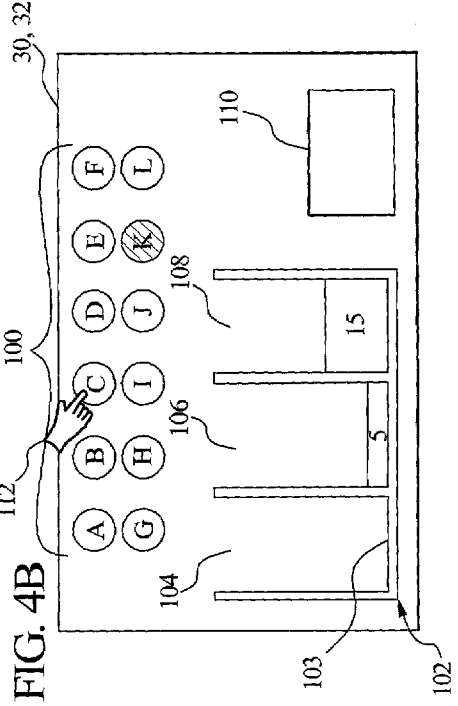
Figure 4C:
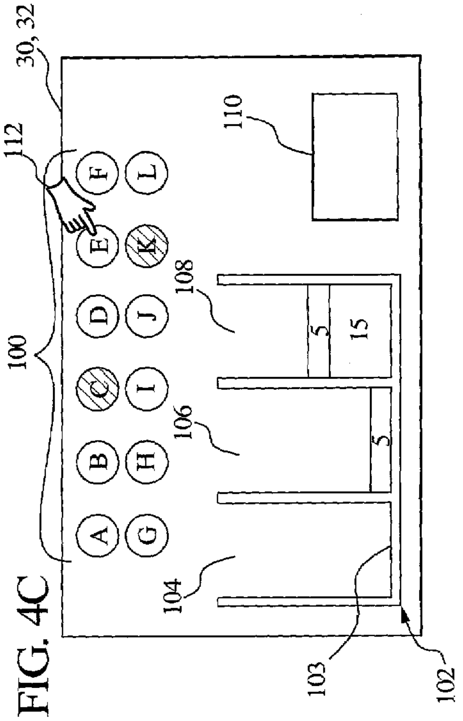
Figure 4D:
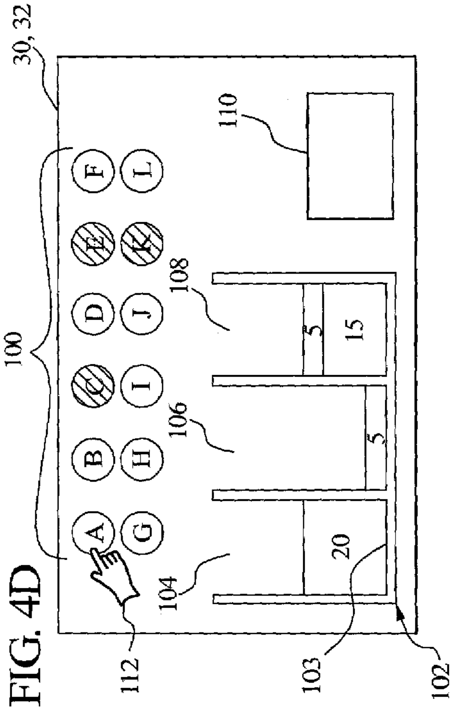
Figure 4E:
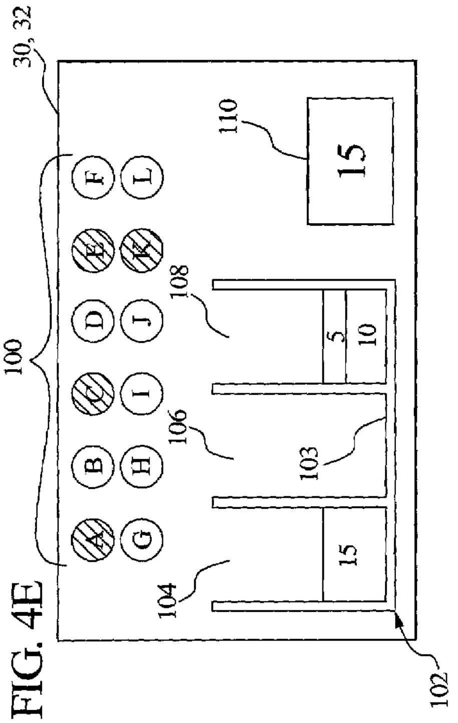
Figure 4F:
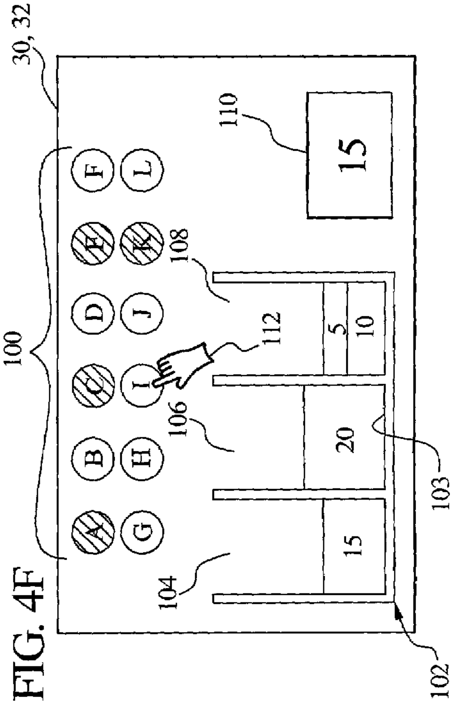
Figure 4G:
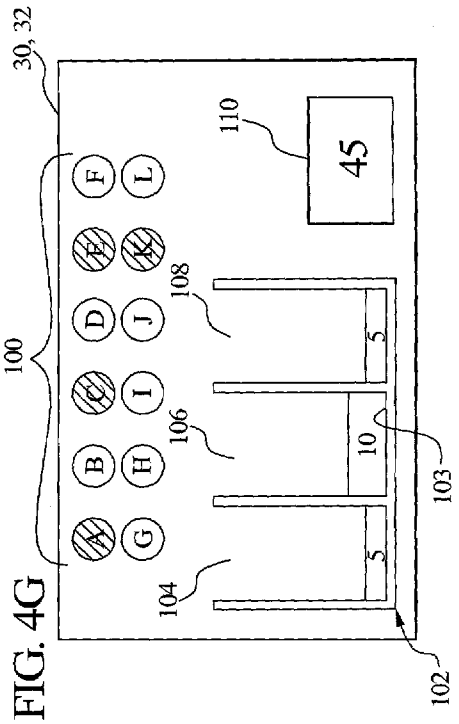
Figure 4H:
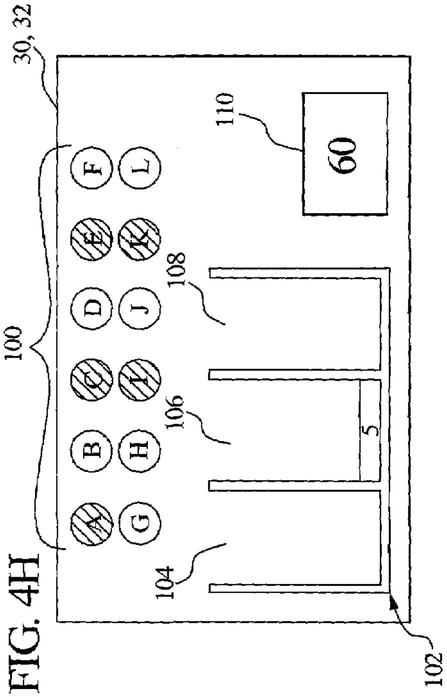
Figure 4I:
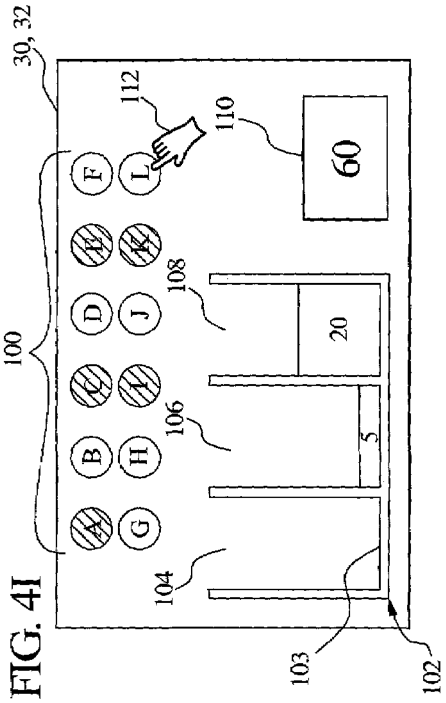
Figure 4J:
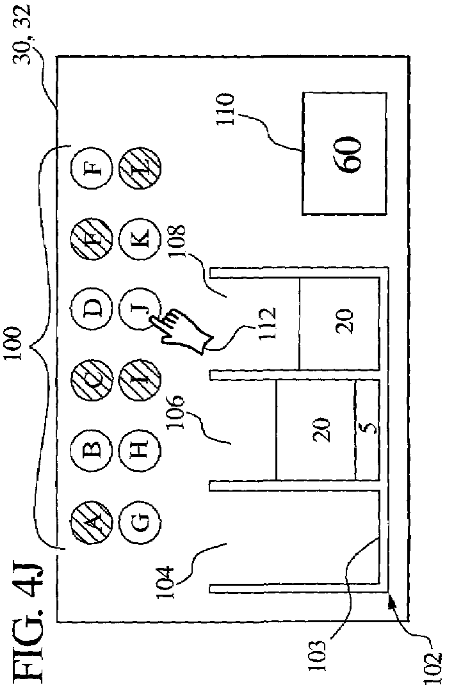
Figure 4K:
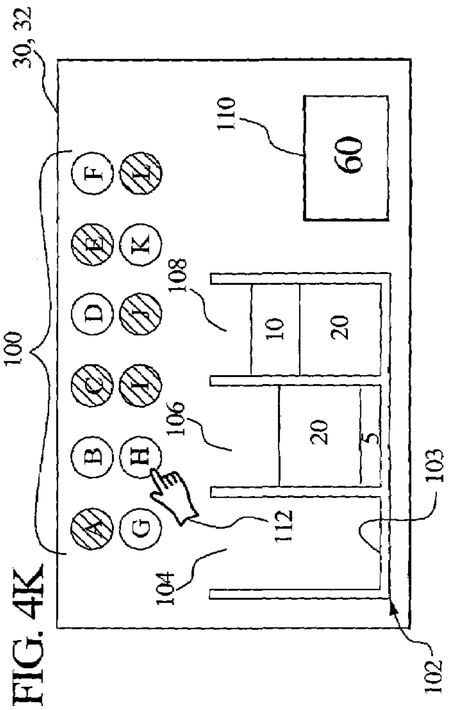
Figure 4L:
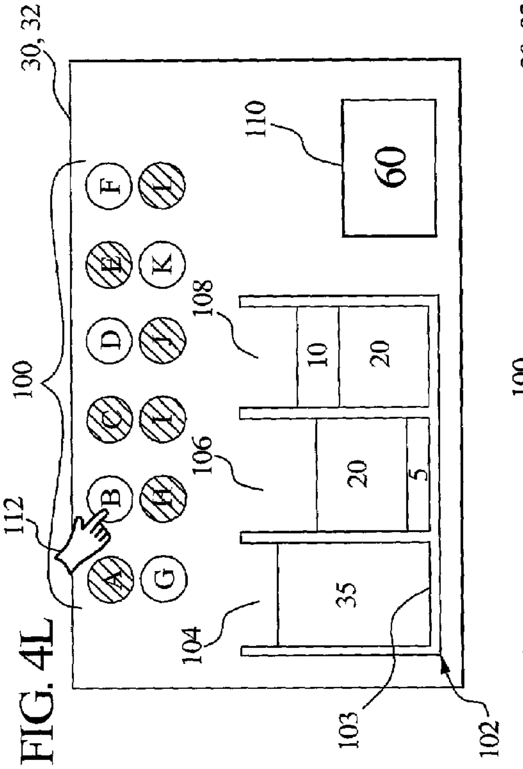
Figure 4M:
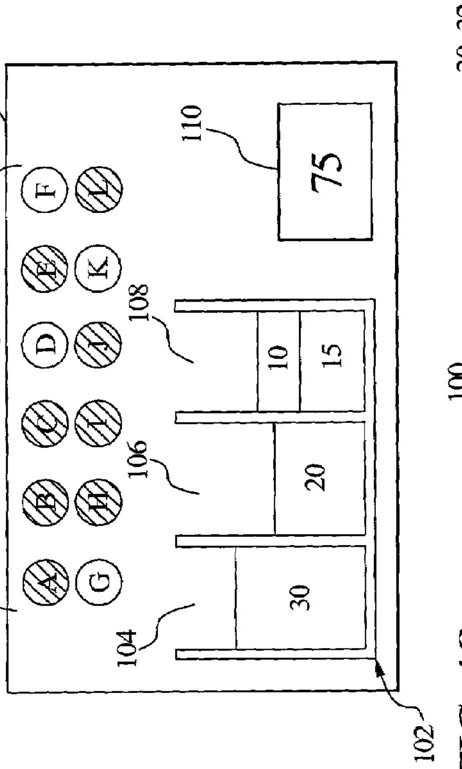
Figure 4N:
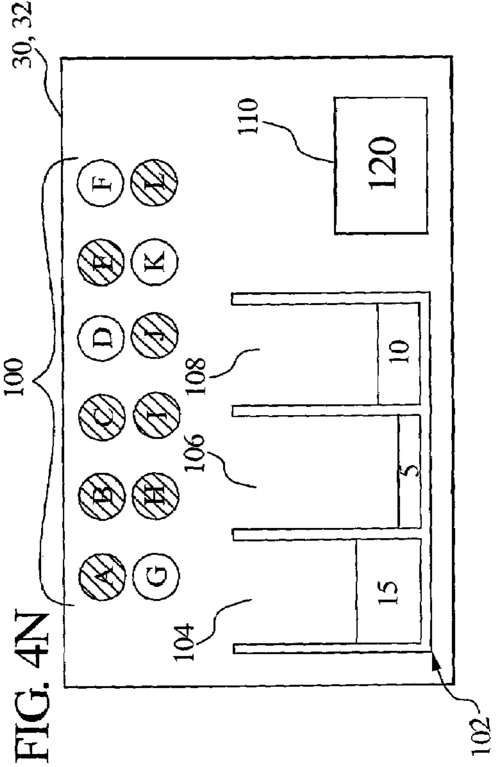
Figure 4O:
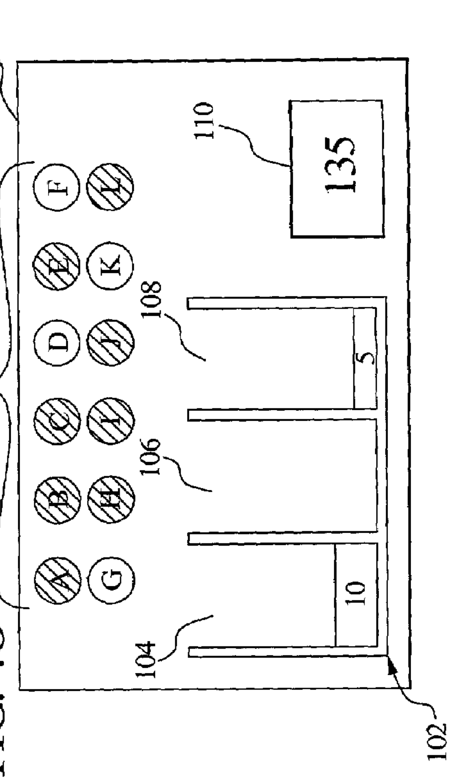
Figure 4P:
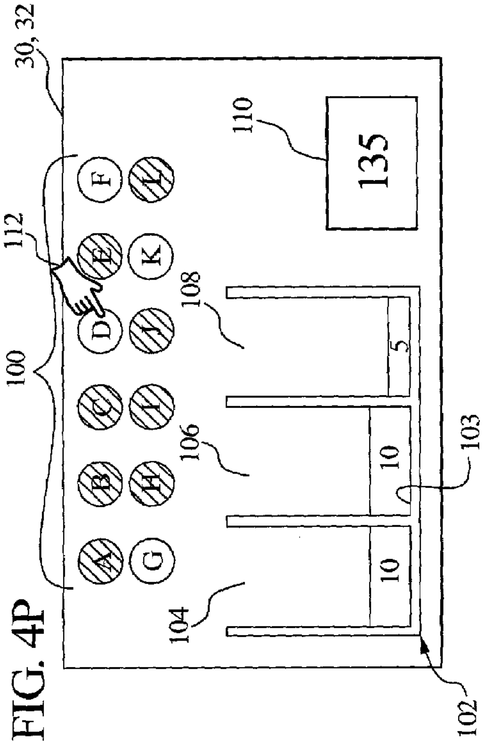
Figure 4Q:
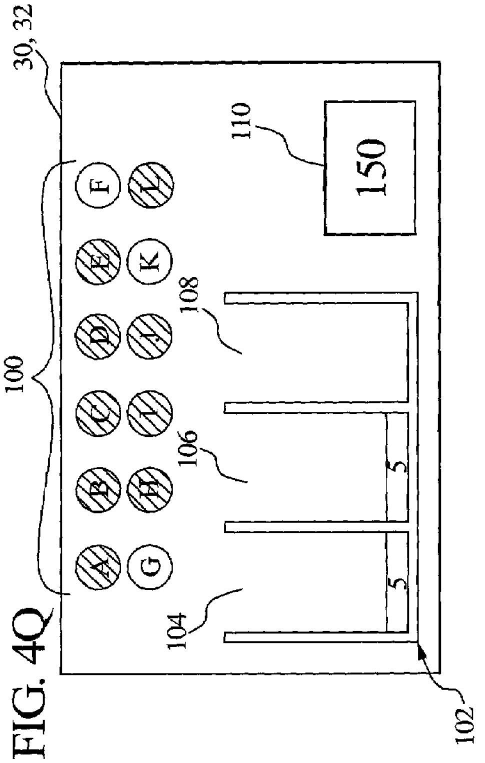
Figure 4R:
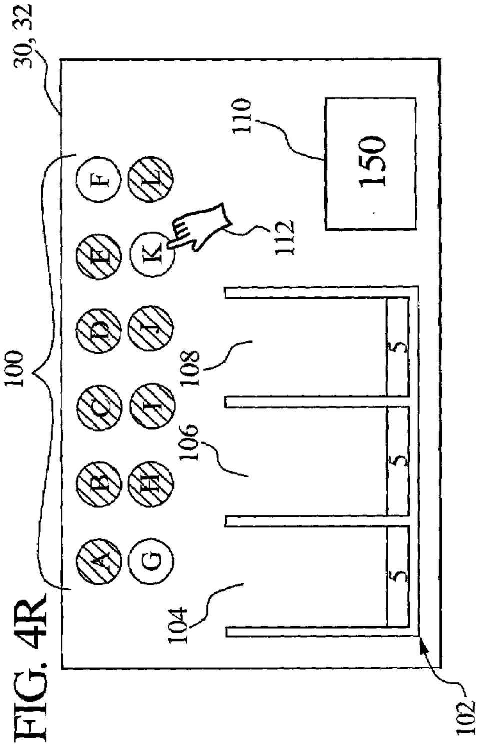
Figure 4S:
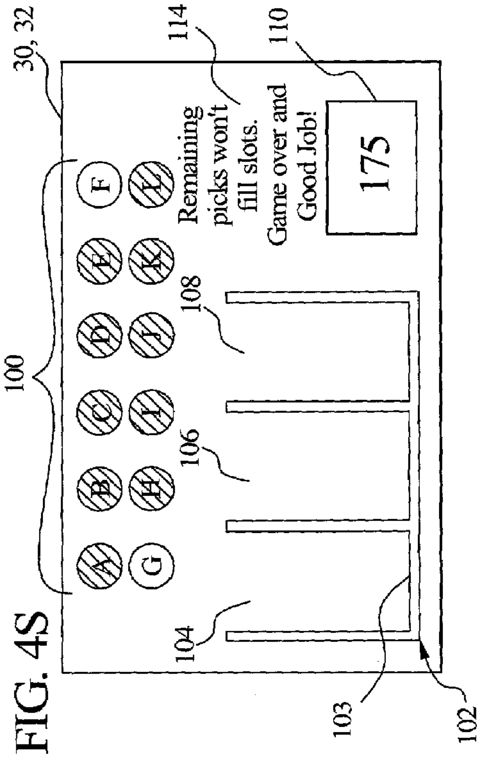

Referring now to FIGS. 4A through 4S, one embodiment of the primary or secondary game of the present invention is illustrated. In FIG. 4A, a player 112 selects the preferably simulated selection K from the selections 100. FIG. 4A also illustrates that the game randomly generates a value of five and places the value five in the slot 106 of the bin 102.

The gaming device or processor thereof can structure the random generations to occur in a plurality of different ways. In one embodiment, the processor randomly assigns a value to each selection 100. For example, the processor assigns the value five to the K selection 100. In another embodiment, the processor randomly assigns a value to the order in which the player is picking. For example, the processor can assign the value five to the first pick that the player makes. In either case, it should be appreciated that the generation of the value five is random.

The processor may also be adapted to randomly place the value into one of the slots in a variety of ways. For example, when the player picks one of the selections 100, the processor can at that point generate the associated slot. Alternatively, the processor can pre-associate a slot with each of the players' picks or with each of the selections before the player begins picking the selections. In either case, once again it should be appreciated that the selection of one of the slots 104, 106 and 108 is random.

As discussed below, it is generally beneficial to the player that the slots 104, 106 and 108 are equally weighted, such that the game is as likely to place a value in any one slot as any other. In an alternative embodiment described below, the slots are not equally weighted. For purposes of illustration, the weighting of the slots 104, 106 and 108 in the examples shown in FIGS. 4A through 4S is assumed to be equally weighted.

Referring now to FIG. 4B, gaming device 10 visually marks the K selection 100 to indicate that the player may no longer select it. In a preferred embodiment, the player can only pick each selection one time. In an alternative embodiment, the player may pick the same selection 100 multiple times or as many times as the player desires. As illustrated, the player 112 picks the C selection 100. Upon picking the C selection 100, gaming device 10 generates the value fifteen through one of the methods discussed above. Gaming device 10 randomly chooses that the value fifteen be placed in the slot 108 of the bin 102.

Gaming device 10 may perform a fun and exciting visual technique to place a value into one of the slots. For example, the value may be intermittently shown in various slots 104, 106 and 108 before finally being deposited into the selected slot. Alternatively, the value falls from above the slots 104, 106 and 108 and changes its horizontal direction, wherein the value finally falls into the generated slot. The value may rotate or spin or otherwise make any movement to indicate that a random selection is taking place. In this way, the player may watch and hope that the value falls into a desired slot.

Gaming device 10 in one preferred embodiment provides an award when each of the slots 104, 106 and 108 has a value that covers the bottom 103 of the bin 102. As illustrated, only the bottom of slot 106 is covered after the player's selection in FIG. 4A and only the bottoms of the slots 106 and 108 are covered by values after the player makes the selection in FIG. 4B. The award display or award meter 110 therefore shows that gaming device 10 has not issued any award to the player as of the time of FIG. 4B.

The player 112 chooses the E selection 100 as illustrated in FIG. 4C, wherein the game randomly generates another five value and again randomly places the five value in the slot 108. The five value rests on or is positioned adjacent to the fifteen value. In one preferred embodiment, the sizes of the shapes representing the values reflect the amount of the values or the relative amount of the values. For example, where the slots 104, 106 and 108 are vertical, the height of the value fifteen is approximately three times as high as the height of the value five. As discussed below, this has a functional purpose.

Referring now to FIG. 4D, the player 112 chooses the A selection 100, wherein gaming device 10 randomly generates a twenty value and places it in the slot 104 of the bin 102. The twenty value fulfills the award requirement that the bottom 103 of the bin 102 for each slot 104 through 108 must be covered.

Referring now to FIG. 4E, one preferred embodiment for an issuance of an award for the gaming device 10 of the present invention is illustrated. Gaming device 10 automatically selects the lowest value at or covering the bottom 103 of each of the slots 104, 106 and 108. As illustrated in FIG. 4D, the value five is the lowest value among the other values fifteen and twenty. Gaming device 10 removes the value five from the slot 106 and subtracts the value five from the remaining values at the bottom of slots 104 and 108. Gaming device 10 deposits the three values of five into the award meter 110. The award meter 110 therefore shows fifteen credits. The value in the slot 104 reduces by five from twenty to fifteen. The value fifteen in the slot 108 reduces by five from fifteen to ten. The value five in slot 108 adjacent to or on top of the value fifteen in slot 108 of FIG. 4D remains unchanged in FIG. 4E.

In an alternative embodiment, gaming device 10 awards the entire value at or covering the bottom 103 of each of the slots 104, 106 and 108. Here, gaming device 10 would remove the entire value twenty from the slot 104, the entire value five from the slot 106 and the entire value fifteen from the slot 108. Gaming device 10 would deposit the three values into the award meter 110, which would instead increment by forty credits (not illustrated). Afterward, the slots 104 and 106 would be empty and the slot 108 would retain the value five.

It should therefore be appreciated that when multiple values are in the same slot such as the values fifteen and five in the slot 108 of FIG. 4D, the values form a ranking. That is, the oldest value or the value closest to the bottom 103 (the fifteen value in FIG. 4D) has the highest ranking, while the value above has the next highest ranking, etc.

Referring now to FIG. 4F, the player 112 chooses the I selection 100. The game in turn randomly generates the value twenty and randomly places the value into the slot 106. The value twenty is in or covers the only uncovered portion of the bottom 103 of the bin 102, which satisfies the preferred award requirement of the present invention.

Referring now to FIG. 4G, gaming device 10 removes the smallest value from the three lowest values (i.e., values covering the bottom 103 of each of the slots 104, 106 and 108) and therefore removes the value of ten from each slot 104, 106 and 108. Gaming device 10 adds thirty credits to the award meter 110, removes ten credits from the slot 108 and subtracts ten credits from each of the values covering the bottom of slots 104 and 106, respectively.

As illustrated in FIG. 4G, the bottom 103 remains covered in each slot even after the removal and reduction of the ten values. As illustrated by FIG. 4H, gaming device 10 again removes the lowest value of five from, in this case, both the slots 104 and 108 and subtracts the value five from the value ten in the slot 106. Gaming device 10 thereby adds fifteen credits to the award meter 110, bringing the player's total to sixty credits.

Referring now to FIG. 4I, the player 112 chooses the L selection 100, and gaming device 10 generates the twenty value in the slot 108. Referring now to FIG. 4J, the player 112 chooses the J selection 100, wherein gaming device 10 generates another twenty value and randomly places it in the slot 106 in a ranking behind the value five, which sits in the top ranking of the slot 106.

Referring now to FIG. 4K, the player 112 chooses the H selection 100, wherein gaming device 10 randomly generates a ten value and randomly places it in the slot 108, in the second ranking behind the top ranked twenty value. The game does not provide an award to the player because the bottom 103 of the slot 104 remains uncovered.

Referring now to FIG. 4L, the player 112 having less selections to choose from chooses the B selection 100. Gaming device 10 randomly generates the value thirty-five and places it in the slot 104, thereby covering the missing portion of the bottom 103.

Referring now to FIG. 4M, gaming device 10 removes the smallest value five from the slot 106, subtracts the value five from the remaining slots 104 and 108 and provides fifteen credits to the player as illustrated in the award meter 110. Referring now to FIG. 4N, because the bottom of each of the slots remains covered after the award issuance illustrated in 4M, gaming device 10 automatically issues a further award to the player. Gaming device 10 removes the smallest value of fifteen from the slot 108, whereby the second ranked value ten moves into the first ranking of the slot 108. Gaming device 10 subtracts the value fifteen from the slots 104 and 106 and adds forty-five credits to the award meter 110, bringing the total to one hundred twenty credits.

Referring now to FIG. 4O, the bottoms of the slots 104, 106 and 108 remain covered even after the second award issuance of FIG. 4N. Therefore, gaming device 10 removes the smallest value five from the slot 106 and subtracts the smallest value five from the remaining slots 104 and 108. Gaming device 10 adds another fifteen credits to the award meter 110.

Referring now to FIG. 4P, the player 112 picks the D selection 100, wherein gaming device 10 generates the ten value and randomly places it in the slot 106 thereby covering the final missing portion of the bottom 103. Referring now to FIG. 4Q, gaming device 10 removes the smallest value five from the slot 108, subtracts the value five from the slots 104 and 106 and adds another fifteen credits to the player's award meter 110.

Referring now to FIG. 4R, the player 112 chooses the K selection 100, wherein the gaming device 10 generates the five value, randomly places it in the slot 108 and covers the final missing portion of the bottom 103. In FIG. 4S, gaming device 10 removes the smallest value five, which resides in each of the slots 104, 106 and 108 and provides an award of fifteen credits as illustrated by the award meter 110. The bin 102 is now completely empty. Because the player only has two selections left to pick from, the player cannot fill the bottom 103 of each slot 104, 106 and 108. The primary or bonus game of gaming device 10 therefore automatically ends in one embodiment. The display device 30 or 32 shows a message 114, which informs the player that the game is over. The player has won a total of one hundred seventy-five credits.

The embodiments disclosed in FIGS. 4A through 4S illustrate a number of possible endings for the present invention. The player can either pick each one of the selections 100, wherein the secondary or primary game ends. Alternatively, the values may become so positioned or the slots 104, 106 and 108 may become empty so that there is not enough selections left to cover the bottom 103 of each of the slots.

Figures 5, 6A, 6B, 6C:
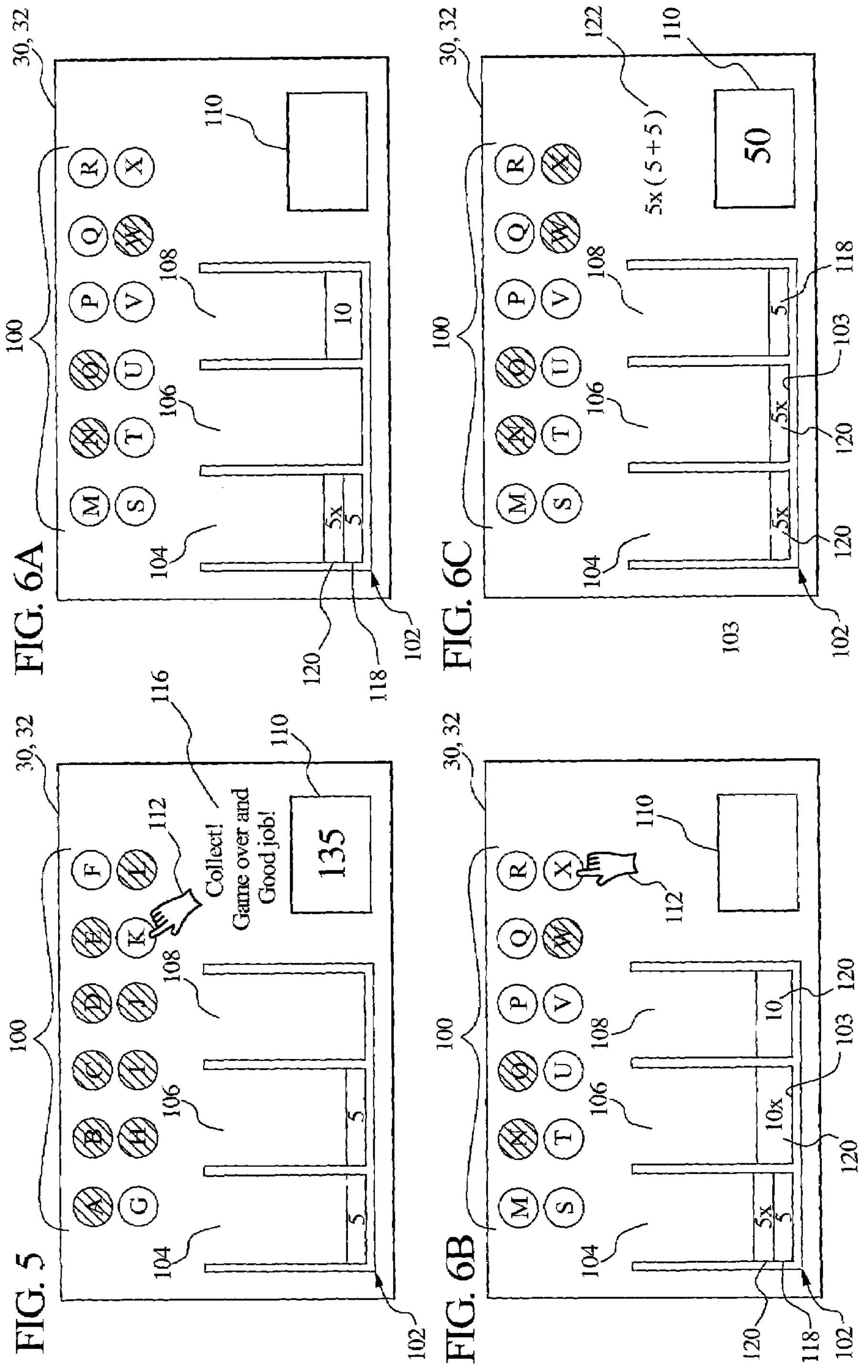
FIG. 5 is an elevation view of a display device illustrating one alternative embodiment of the ending of the primary or secondary game of the present invention.
FIGS. 6A though 6D are elevation views of a display device illustrating one alternative embodiment of the primary or bonus game of the present invention, wherein game credits and multipliers are issued.

Referring now to FIG. 5, an alternative ending for the secondary or primary game of the present invention is illustrated. At the point of the game illustrated in FIG. 4R, the player 112 picks the K selection 100. In FIG. 5, however, gaming device 10 randomly generates a collect instead of a value, wherein the collect outcome ends the primary or secondary game of the present invention. The display device 30 or 32 shows a message 116 informing the player that the pick of the K selection resulted in a collect instead of a value. The game ends and the player receives one hundred thirty-five credits as illustrated in the award meter 110.

The collect outcomes may be randomly assigned to one of the selections 100. Alternatively, the collect outcome is assigned to a pick of an order. Further alternatively, the game automatically randomly generates the collect outcome if gaming device 10 is not player selectable. If a secondary game of the present invention should randomly issue the collect upon the player's first pick or after a low number of picks, gaming device 10 in one embodiment provides a consolation award to the player. The consolation award may have any value and is preferably a relatively small value compared to the average award that the gaming device 10 issues. If gaming device 10 is a primary game, the risk of choosing a collect on the first or one of the first picks is born by the player. It should also be appreciated that a limited number of future selection outcomes may be associated with a selection, such as "pick three more selections," wherein the game ends after the additional picks.

Referring now to FIGS. 6A through 6C, an alternative embodiment is illustrated wherein the game issues game credits 118 and game credit multipliers 120. FIG. 6A illustrates the selections M through X, wherein the player has previously selected the N selection 100, the O selection 100 and the W selection 100. Gaming device 10 has in some order randomly generated the five value 118 and the ten value and placed them respectively in the slots 104 and 108. The game has also randomly generated a 5× multiplier 120 and randomly placed it in the second ranking of the slot 104 above the highest ranked five value.

Referring now to FIG. 6B, the player chooses the X selection 100, wherein gaming device 10 randomly generates a 10× multiplier 120 and randomly places it in the slot 106. The 10× multiplier 120 covers the bottom of the last uncovered portion of the bottom 103, so that the gaming device 10 in FIG. 6C issues an award to the player.

In FIG. 6C, display device 30 or 32 shows an equation 122, which depicts how gaming device 10 arrives at the award of fifty, shown in the award meter 110. In FIG. 6B, it should be appreciated that the smallest value 118 is five. In the same manner as provided above, gaming device 10 removes the value five from the slot 104 and subtracts the value five from the 10× multiplier 120 in the slot 106 and from the ten value 120 in the slot 108. As illustrated by the equation 122, gaming device 10 adds the two credit values 120 and multiplies the addition by the 5× multiplier.

In alternative embodiments, the multiplier 120 may simply stand on its own so that the primary or secondary game would remove the entire 10× multiplier instead of subtracting five from the multiplier value of ten. Typically, multiplier values are less than credit values, whereby it may be preferable to have the multiplier 120 act independently from the subtraction of the values 118. The multiplier 120 would then not be taken into consideration when comparing values 118 to determine the one to be provided to the player. That is, gaming device 10 would compare the value five in the slot 104 with the value 10 in the slot 108 but would not include the 10× multiplier 120 in the slot 106 in the comparison.

As illustrated in FIG. 6C, the bottom 103 of the slots 104, 106 and 108 remains covered even after the issuance of 50 credits to the player. Gaming device 10 therefore removes the five value from each of the slots 104 through 108, wherein two of the slots have multipliers 120. That is the 5× multiplier 120, which had the second ranking in the slot 104 of FIG. 6B, moved into the first ranking in FIG. 6C. The 5× multiplier of the slot 106 was obtained by subtracting the smallest value of five from the 10× multiplier of the slot 106 of FIG. 6B.

Figure 6D:
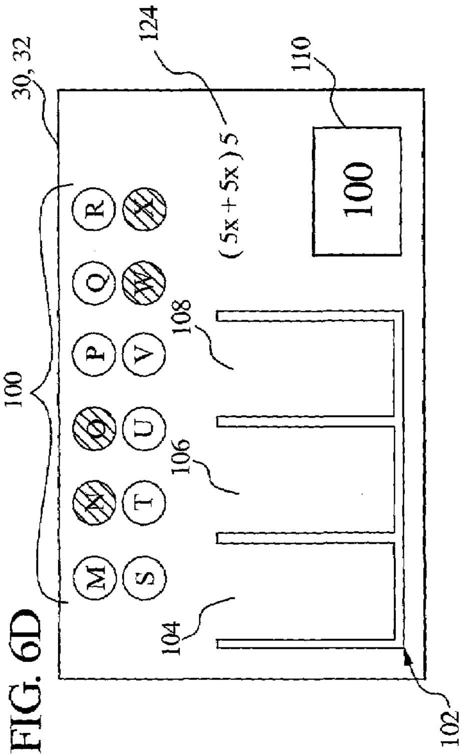

In FIG. 6D, the display device 30 or 32 displays the equation 124 that shows the two 5× multipliers being added together wherein the resulting 10× multiplier multiplies the single value of five. The resulting fifty credits are added to the initial fifty credits provided to the player as indicated by the award meter 110. In an alternative embodiment, gaming device 10 multiplies one of the multipliers 120 by the credit value 118 and then multiplies the second multiplier by the initial product.

Figure 7:
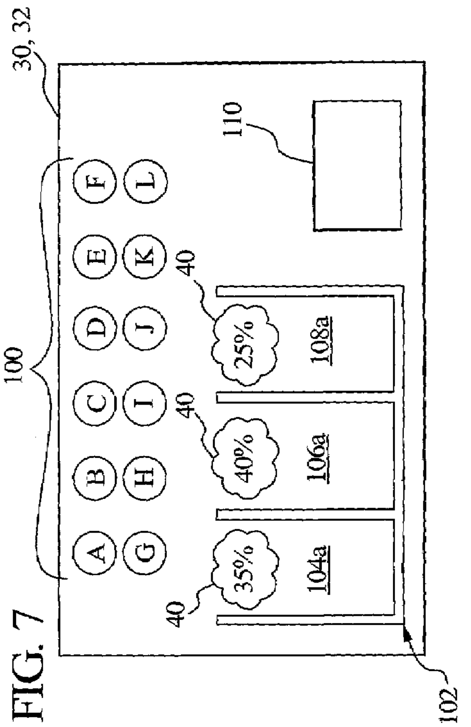
FIG. 7 is an elevation view of a display device illustrating one alternative embodiment of the ending of the primary or bonus game of the present invention having non-equally weighted slots.

Referring now to FIG. 7, an alternative embodiment of the bonus or primary game of the present invention is illustrated, wherein the slots 104, 106 and 108 are not equally weighted. The slots 104, 106 and 108 have heretofore been assumed to be weighted equally, that is, each slot has had approximately a 33.3 percent chance of receiving a value. The slots 104, 106 and 108 of FIG. 7, however, are unequally weighted. The probability distribution is stored in the memory device 40 and can be preset to be any distribution desired by the operator.

It is an advantage to the player to have the slots equally weighted. That is, if one or more slots stockpiles values, especially in an embodiment having a collect outcome, the player likely does not receive as many awards. FIG. 7 illustrates three unequally weighted slots 104*a*, 106*a* and 108*a*, however, the present invention includes any number of unequally weighted slots. The mathematics of gaming device 10, however, are thought to favor the provision of three slots in the bin 102.

Figure 8A:
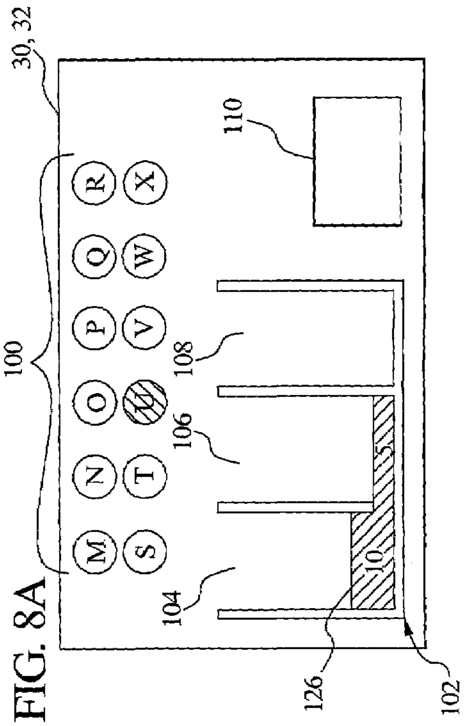
FIGS. 8A though 8F are elevation views of a display device illustrating one alternative embodiment of the primary or bonus game of the present invention having multi-slot values.
Figure 8B:
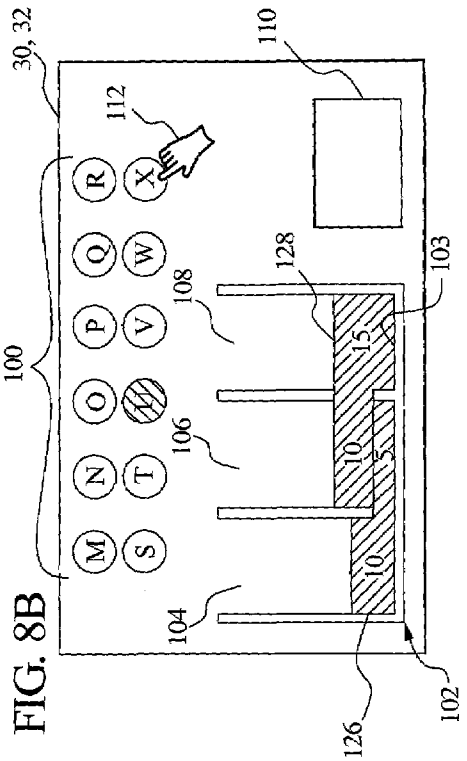

Referring now to FIGS. 8A through 8F, a further alternative embodiment having multi-slot values is illustrated. In FIG. 8A, for example, the player selected the U selection 100, wherein gaming device 10 issued a multi-slot value 126. The multi-slot value 126 provides a value of ten in the slot 104 and a value of five in the slot 106. Referring now to FIG. 8B, when the player 112 picks the X selection 100, gaming device 10 issues a second multi-slot value 128. The multi-slot value 128 adds a value of ten having a second ranking in the slot 106 and completes the bin by covering the bottom 103 beneath slot 108.

Figure 8C:
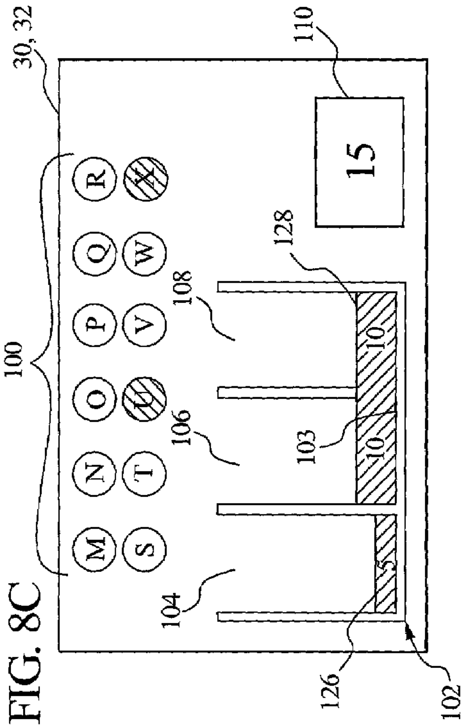

Referring now to FIG. 8C, the game issues an award to the player by subtracting the value five which is the smallest value covering the bottom of the bin 102 in FIG. 8B, which is illustrated in the slot 106. The other five value of the multi-slot value 126 reduces to five and remains in a slot 104. The value ten of the multi-slot value 128 having the second ranking in the slot 106 of FIG. 8B, moves to the highest ranking. The value fifteen of the multi-slot value 128 in slot 108 of FIG. 8B reduces accordingly to ten in the slot 108 of FIG. 8C. The player receives an award of fifteen credits as illustrated in the award meter 110.

Figure 8D:
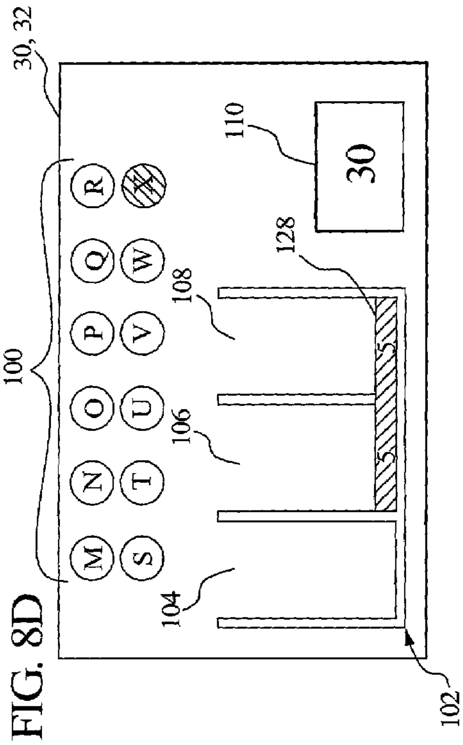

Because the bottom 103 of the bin 102 remains completely covered in FIG. 8C, the game issues a further award to the player in FIG. 8D. Gaming device 10 removes the smallest five value from the slot 104 (the last remaining value of the multi-slot value 126) and subtracts the five value from the remaining slots 106 and 108. Both the remaining values belong to the multi-slot value 128. Gaming device 10 increments the player's award by fifteen credits accordingly.

Figure 8E:
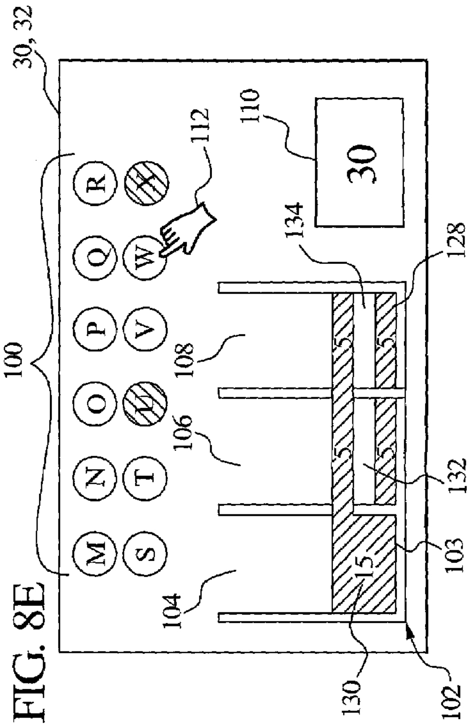

Referring now to FIG. 8E, the player 112 selects the W selection 100, wherein gaming device 10 randomly generates the multi-slot value 130. The multi-slot value 130 provides values for all three slots 104 through 108. As illustrated by the multi-slot values 126, 128 and 130, the multi-slot values of the present invention may have any shape, any orientation and may cover any percentage of the slots. Because the larger value fifteen of the multi-slot value 130 takes up more space of the slot 104 than of slots 106 and 108, gaps 132 and 134 appear in the slots 106 and 108. The gaps will prove fatal for the player.

Figure 8F:
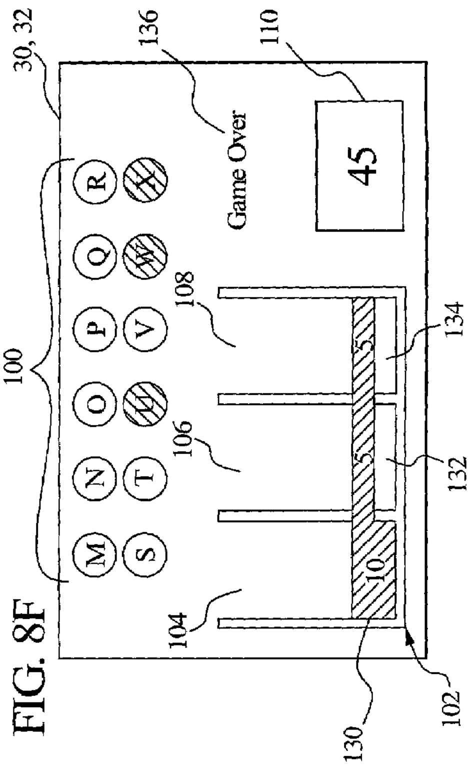

Referring now to FIG. 8F, because the bottom 103 is completely covered in FIG. 8E, gaming device 10 issues an award of fifteen credits to the player. Gaming device 10 subtracts the smallest value of five from the slots 106 and 108 and removes the five value from the slot 104. The gaps 132 and 134 move from the second ranking to the first ranking of their respective slots 106 and 108. Regardless of which selection 100 the player chooses at this point, the bottom 103 of the bin 102 can no longer be completely covered. Therefore, gaming device 10 provides a suitable message 136 that the primary or secondary game of the present invention is over. The player wins a total of forty-five credits as illustrated by the award meter 110.

In an alternative embodiment, gaming device 10 can remove and award values that appear in a row, but that are not necessarily along the bottom 103 of each of the slots 104, 106 and 108. For example, in FIG. 8F gaming device 10 could award the values five, five, five appearing in the second level or second rank of the slots 104, 106 and 108. Still further, in FIG. 8F gaming device 10 could award the values ten, five, five appearing at least in the second level or second rank of the slots 104, 106 and 108. Alternatively, another or third layer of values could build on top of the multi-slot value 130, wherein gaming device 10 awards values from the slots 104, 106 and 108 in the third level or rank to the player.

In even a still further embodiment, a value for example in FIG. 8F could fall through the leg of the multi-slot value 130 to bottom 103 of one of the slots 106 and 108. The multi-slot value 130 in the configuration shown in FIG. 8F does not therefore necessarily terminate the game.

It should be appreciated that up until now, there has been a spatial relationship between the amount of the values and the size of the values. FIG. 4L for example illustrates five values having four different amounts and four different sizes. The value thirty-five consumes seven times as much space of the display device 30 or 32 as does the value five. The two values of twenty on the other hand are of the same size. The spatial relationship does not have to be linear, as illustrated, meaning the value ten does not have to be twice the size as the value five. The value ten could otherwise be only slightly bigger than the value five.

Further alternatively, the values could be replaced by or enclosed by symbols, such as any type of indicia including people, places and things. For instance, instead of the rectangular shapes, the values could be replaced by food dishes, for example fast food or buffet food items. The symbols may or may not actually display the associated value. That is, the value could be displayed in a separate indicator or meter.

In yet another alternative embodiment of the present invention, the values consume the same amount of space regardless of the amount of the values. For example, in FIG. 4L each of the different values five, ten, twenty and thirty-five consume the same amount of space on the display device 30 or 32. Here, each value, regardless of the amount, would correspond to a single rank or level, and would not reside in multiple ranks or levels.

In the illustrated embodiments, the size of the values also relates to the ranking or ordering of the values. For example, the value five fills only one rank or level, while the value ten fills two ranks or levels and the value three fills three ranks or levels. Alternatively, as alluded to above, the rank or order could be associated with the entire value, not the amount of the value. For instance, the value on the bottom 103 of one of the slots 104, 106 or 108 could comprise the lowest rank as a whole, wherein gaming device 10 awards the entire value in the first rank of a slot, not just smallest common denominator of the values in the first rank of each of the slots.

In yet another embodiment of the present invention, when the player 112 selects one of the selections 100, multiple values fall into one or more of the slots 104, 106 or 108. Two or more values can fall into the same slot or the same can occur in multiple slots and/or a single value can fall into two or more or each of the slots, etc.

In still a further embodiment of the present invention, the number of selections by the player is determined by a prior gaming event. The number of selections can for example be dependent upon the outcome of a preliminary or warm-up bonus game. In another example, the number of player selections can depend on the player's wager or a component thereof, such as paylines played, bet per payline or total bet. Further still, the number of player selections can depend on the outcome of the base game, for example different combinations of symbols in a slot game provide different amounts of player selections.

In yet a further embodiment of the present invention, gaming device 10 enables the player to select which slot 104, 106 or 108 receives the value of the next selection. Here, the player does not know the amount of the value but still tries to even out the levels or rankings in the various slots in an attempt to maximize the player's award.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming device comprising:

a display device;

a game having a plurality of groups displayed by the display device, wherein each group has a same plurality of predetermined ranks in each play of the game, said ranks including a designated rank;

a plurality of values, at least two of said values being different, the values sequentially displayed by the display device, wherein each value is associated with at least one of the ranks of at least one of the groups; and an award provided to the player when the designated rank in each of said groups is associated with one of the values.

2. The gaming device of claim 1, wherein the award is based on at least one of the values associated with the designated rank.

3. The gaming device of claim 1, wherein the award is based on each of the values associated with the designated rank.

4. The gaming device of claim 1, wherein values associated with the groups are chronologically ranked.

5. The gaming device of claim 1, wherein the designated rank is the first rank filled when one of the values is associated with at least one of the groups.

6. The gaming device of claim 1, wherein the designated rank is the visually lowest rank.

7. The gaming device of claim 1, wherein the award is based on a portion of at least one of the values associated with the designated rank, wherein the remaining portion of the value remains associated with the designated rank.

8. The gaming device of claim 1, wherein the award is based on a portion of at least one of the values associated with the designated rank, the portion being equal to the smallest value associated with the designated rank of each of the groups, wherein the remaining portion of the value remains associated with the designated rank.

9. The gaming device of claim 1, wherein the values are associated with a plurality of player selectable selections and which includes a game terminator associated with at least one selection.

10. The gaming device of claim 1, which includes a game sequence that terminates further player choices when each of the ranks of at least one of the groups has an associated value.

11. The gaming device of claim 1, which includes a plurality of selections, said values associated with the selections and a game termination which occurs upon the picking of all of the selections by the player.

12. The gaming device of claim 1, which includes a plurality of selections, said values associated with the selections, and a number of player choices of the selections, the number based on a gaming event selected from the group consisting of: a preliminary bonus game outcome, a base game outcome, a wager amount and a wager component.

13. The gaming device of claim 1, which includes a plurality of selections, said values associated with the selections including a plurality of values associated with at least one of the selections.

14. The gaming device of claim 1, which includes at least one of the values associated with a plurality of the groups.

15. The gaming device of claim 1, which includes means for enabling the player to select the group to which the value is associated.

16. The gaming device of claim 1, which is accessible via a data network.

17. The gaming device of claim 16, wherein the network is an internet.

18. The gaming device of claim 1, wherein the groups are non-equally weighted such that at least one value is more likely to be associated with one of the groups than at least one other group.

19. The gaming device of claim 1, wherein at least one of the values in at least one of the groups changes rank when the award is provided to the player.

20. The gaming device of claim 1, wherein the ranks of the groups become sequentially filled with values as the values are sequentially displayed by the display device.

21. A gaming device comprising:

a display device;

a processor that communicates with the display device, the processor operating with the display device to:

sequentially display a plurality of symbols and rank each of the symbols in one of a plurality of areas on the display device;

provide a first award to a player when each of the plurality of areas has one of the symbols associated with a designated rank;

remove at least one of the symbols from said symbol's respective area and move a second symbol associated with said area if the second symbol has a rank adjacent to the rank of the removed symbol; and provide a second award to the player if each of the plurality of areas continues to have one of the symbols associated with the designated rank.

22. The gaming device of claim 21, wherein the plurality of symbols are displayed as a result of an event selected from the group consisting of: a random selection by the player and a random generation by the processor.

23. The gaming device of claim 21, which includes a value associated with each symbol, wherein the first award is based on at least one of the values associated with the symbols of the designated rank.

24. The gaming device of claim 21, which includes a separate value associated with each symbol, wherein the second award is based on each of the remaining values associated with the symbols of the designated rank, wherein at least one of the remaining values has been mathematically altered by a value used to determine the first award.

* * * * *

UNITED STATES PATENT AND TRADEMARK OFFICE

CERTIFICATE OF CORRECTION

PATENT NO. : 7,037,191 B2 
APPLICATION NO. : 10/137530
DATED : May 2, 2006
INVENTOR(S) : Paulina Rodgers et al.

It is certified that error appears in the above-identified patent and that said Letters Patent is hereby corrected as shown below:

Page 2, under U.S. Patent Documents, change “6,126,547 A 10/2000 Ishimoto” to --6,126,547 A 10/2000 Fier--.

Page 2, under U.S. Patent Documents, change “6,142,824 A 10/2000 Savoca” to --6,142,824 A 10/2000 Kodachi et al.

Signed and Sealed this

Twenty-ninth Day of August, 2006

JON W. DUDAS
*Director of the United States Patent and Trademark Office*